US006668313B2

(12) United States Patent
Koob et al.

(10) Patent No.: US 6,668,313 B2
(45) Date of Patent: Dec. 23, 2003

(54) MEMORY SYSTEM FOR INCREASED BANDWIDTH

(75) Inventors: Christopher Koob, Pflugerville, TX (US); David P. Sonnier, Austin, TX (US)

(73) Assignee: Agere Systems, Inc., Allentown, PA (US)

( * ) Notice: Subject to any disclaimer, the term of this patent is extended or adjusted under 35 U.S.C. 154(b) by 128 days.

(21) Appl. No.: 10/026,350

(22) Filed: Dec. 21, 2001

(65) Prior Publication Data

US 2003/0120884 A1 Jun. 26, 2003

(51) Int. Cl.[7] .............................................. G06F 12/06
(52) U.S. Cl. ........................................................ 711/170
(58) Field of Search .................................. 711/170, 171, 711/172, 173; 710/129, 130

(56) References Cited

U.S. PATENT DOCUMENTS

| 5,303,302 A |   | 4/1994 | Burrows |   |
|---|---|---|---|---|
| 5,491,808 A | * | 2/1996 | Geist, Jr. ..................... | 395/427 |
| 5,751,951 A | * | 5/1998 | Osborne et al. ......... | 395/200.8 |
| 5,784,698 A | * | 7/1998 | Brady et al. ................. | 711/171 |
| 6,049,802 A |   | 4/2000 | Waggener et al. |   |

FOREIGN PATENT DOCUMENTS

GB        2306714 A       7/1997

* cited by examiner

Primary Examiner—Kevin L. Ellis
(74) Attorney, Agent, or Firm—James H. Beusse; Beusse Brownlee Bowdoin & Wolter, P.A.

(57) ABSTRACT

A system and method for memory management in a high-speed network environment. Multiple packets are interleaved in data streams and sent to a Memory Manager System. Read and write requests are queued in FIFO buffers. Subsets of these requests are grouped and ordered to optimize processing. This method employs a special arbitration scheme between read and write accesses. Read and write requests are treated as atomic. Memory bank selection is optimized for the request being processed. Alternating between memory bank sets is done to minimize bank conflicts. Link list updates are pipelined. Multiple independent link lists may be supported with the inclusion of a link list identifier. Arbitration between read and write requests continues until the group is exhausted. Then, processing is repeated for the next requests in the BRAM (buffer memories).

15 Claims, 7 Drawing Sheets

GROUP READ REQUESTS

GROUP READ REQUESTS ALTERNATIVE

MEMORY SYSTEM FOR INCREASED BANDWIDTH

BACKGROUND OF THE INVENTION

This invention relates in general to an apparatus and methodology for computer memory management yielding increased memory bandwidth. More particularly, the invention relates to an apparatus and methodologies for optimizing the bandwidth in processing a plurality of read and write requests. The invention has particular application to the use of high-speed networks although it is not limited thereto.

Effective management of memory resources is one mechanism that can be leveraged to increase bandwidth in high-speed networks. More particularly, high-speed network memory bandwidth requirements cannot be achieved by randomly interleaving read and write requests to an external RAM controller especially if the data units are smaller than a block of data. Issues with common approaches to memory management are resolving bank conflicts, accommodating bus turn around, processing varied word lengths, supporting a pipelined architecture, mitigating processing delays and guaranteeing memory bandwidth.

A well-known approach for memory management is the utilization of link lists to manage multiple queues sharing a common memory buffer. A link list is commonly comprised of data, where each byte has at least one pointer (forward and/or backward) attached to it, identifying the location of the next byte of data in the chain. Typical link list management schemes do not allow pipelining. Therefore, the standard methodologies of prior art link list structures to optimize memory management is not particularly suited to the handling of very high-speed processes.

Another method to process memory allocation is described in U.S. Pat. No. 6,049,802 to Waggener and Bray entitled "System And Method For Generating A Linked List In A Computer Memory". This patent discloses link lists that contain several key list parameters. A memory manager determines which link list the data belongs in based on key list parameters. This patent also discloses that the address of the next location in the link list is determined before data is written to the current location for a packet processor. While this allows the next address to be written in the same cycle in which data is written, it is not optimized for very high-speed networks.

One more memory storage technique is described in U.S. Pat. No. 5,303,302 issued to Burrows entitled "Network Packet Receiver With Buffer Logic For Reassembling Interleaved Data Packets". In this patent, a network controller receives encrypted data packets. A packet directory has an entry for each data packet stored in a buffer. Each directory entry contains a pointer to the first and last location in the buffer where a corresponding data packet is stored along with status information for the data packet. A method is also disclosed for partial data packet transmission management for the prevention of buffer overflow. Processing optimization for the allocation and management of memory is not achieved in this method for pipeline processing.

SUMMARY OF THE INVENTION

The present invention is directed toward a system and method for memory management in a high-speed network environment. Multiple packets are interleaved in data streams and sent to a Memory Manager System. Read and write requests are queued in FIFO buffers. Subsets of these requests are grouped and ordered to optimize processing. This method employs a special arbitration scheme between read and write accesses. Read and write requests are treated as atomic. Memory bank selection is optimized for the request being processed. Alternating between memory bank sets is done to minimize bank conflicts. Link list updates are pipelined. Multiple independent link lists may be supported with the inclusion of a link list identifier. Arbitration between read and write requests continues until the group is exhausted. Then, processing is repeated for the next requests in the BRAM (buffer memories).

The disclosed process optimizes bandwidth while accessing external memory in pipeline architectures.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
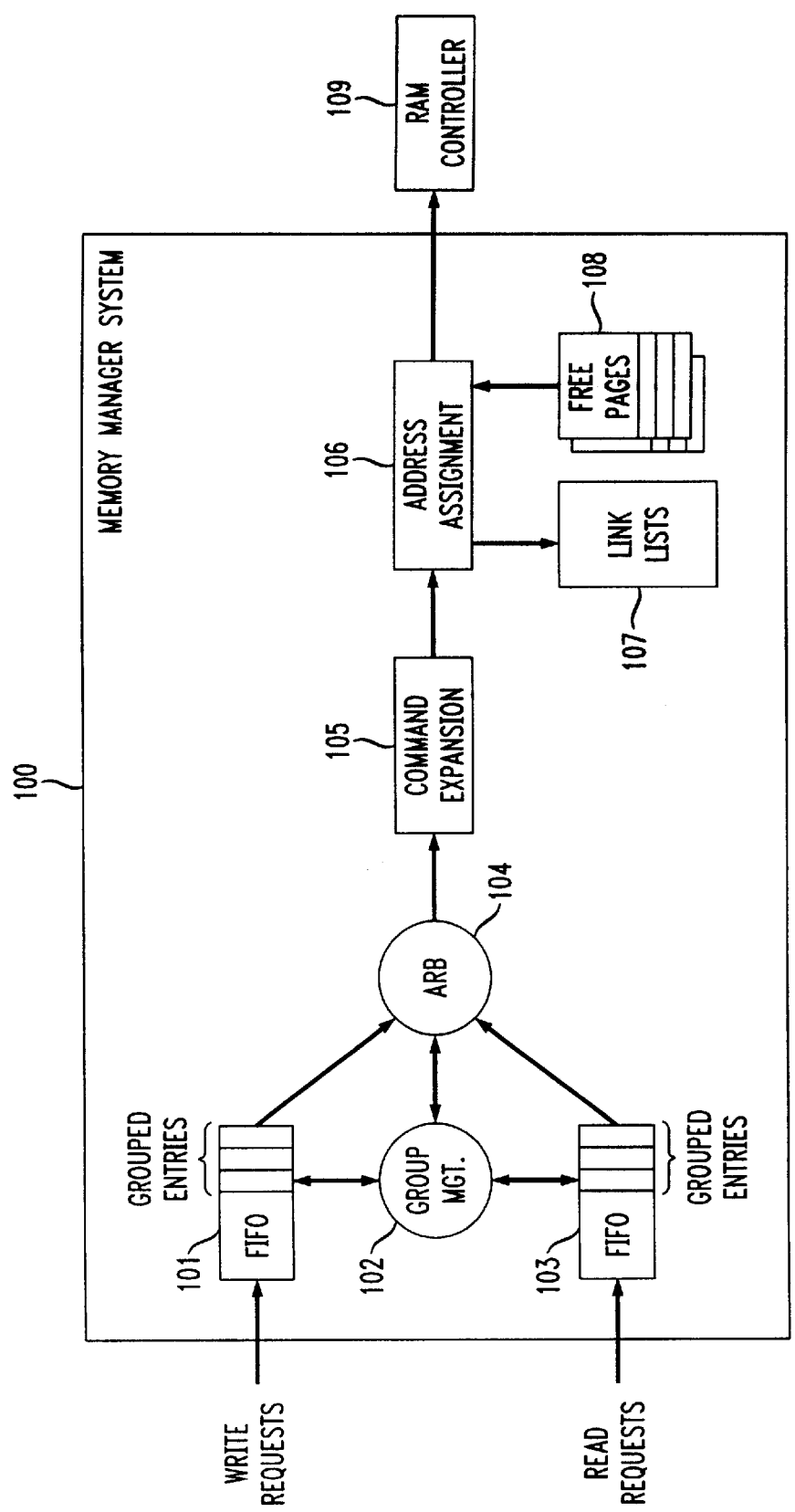
FIG. 1 is a block diagram of the memory system.

For purposes of illustration only, and not to limit generality, one embodiment of the present invention supports a 10 Gigabits per second bandwidth, which equates to 1.25 Gigabytes per second. This embodiment utilizes a FCRAM (Fast Cycle RAM) as the external RAM device. Current FCRAM has a data rate of 400 MHz. This yields 3.125 bytes per cycle throughput (i.e., 1.25 Gigabytes/sec divided by 400 MHz) for a single direction. Since read and write executions need to be supported, the bandwidth is doubled. To support a 10 Gigabits/sec bandwidth, a 200 MHz FCRAM implementation would need to be 6.25 bytes wide if memory were bit addressable. Since memory is not bit addressable, one addressable line is chosen yielding 12.5 bytes, which is subsequently rounded to 16 bytes. The FCRAM mode of operation selected takes two cycles to generate four data words yielding a minimum addressable unit of memory of 64 bytes.

The present invention is directed toward a system and method for memory management in a high-speed network environment where multiple packets are generated. These packets are interleaved in multiple data streams. Each packet is sent in pieces to the Memory Manager System 100 of FIG. 1. Write requests are queued in FIFO buffer 101. Read requests are queued in FIFO buffer 103. Upon receipt of these requests, a subset of multiple entries is grouped for further processing by the Group Manager 102. Group processing determines which read and write requests are going to be selected for current processing based on the quantity of long words examined. The submission sequence of read and write requests to be executed is determined at the Arbitrator 104. Bank selection from a multiple of banks is determined in order to execute the read and write requests at the Command Expansion 105. Address Assignment 106 for the request being executed is performed based on the Link List(s) 107 and/or Free Pages 108 of memory available. Multiple free lists could also be used in this scheme 108. Upon determining the physical memory access desired, the external, low-level RAM Controller 109 is accessed (e.g., FCRAM).

This embodiment supports two timing issues: 1) the bandwidth has to read and write 128 bytes every 60 nanoseconds; and 2) the bandwidth has to read and write 64 bytes every 37 nanoseconds. Thus a read request or a write request is considered either a long word length (128 byte word length) or a short word length (64 byte word length). As indicated in FIG. 1, buffered read 103 and write 101 requests are grouped independently in order to optimize processing.

Figure 2:
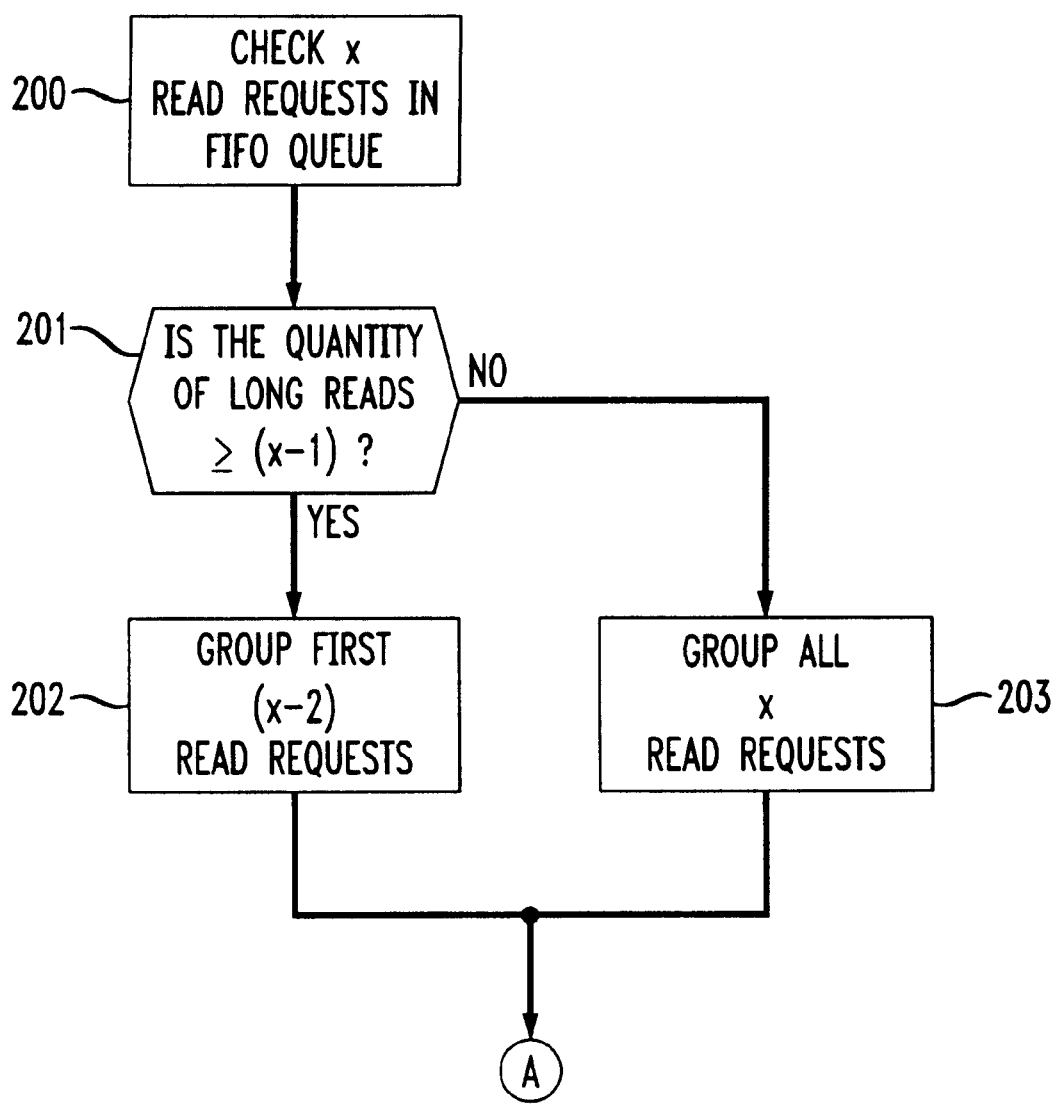
FIG. 2 is a flow diagram of the processing used to group (i.e., select) read requests that are queued in a FIFO buffer.

FIG. 2 details the group processing for read requests where x is equal to five in the current embodiment. The first five read requests are checked 200 to determine how many reads are long. If there are four or more long read requests 201, then the first three form the group 202 and are selected out of the five for present processing, otherwise all five read requests form the present group 203.

Figure 3:
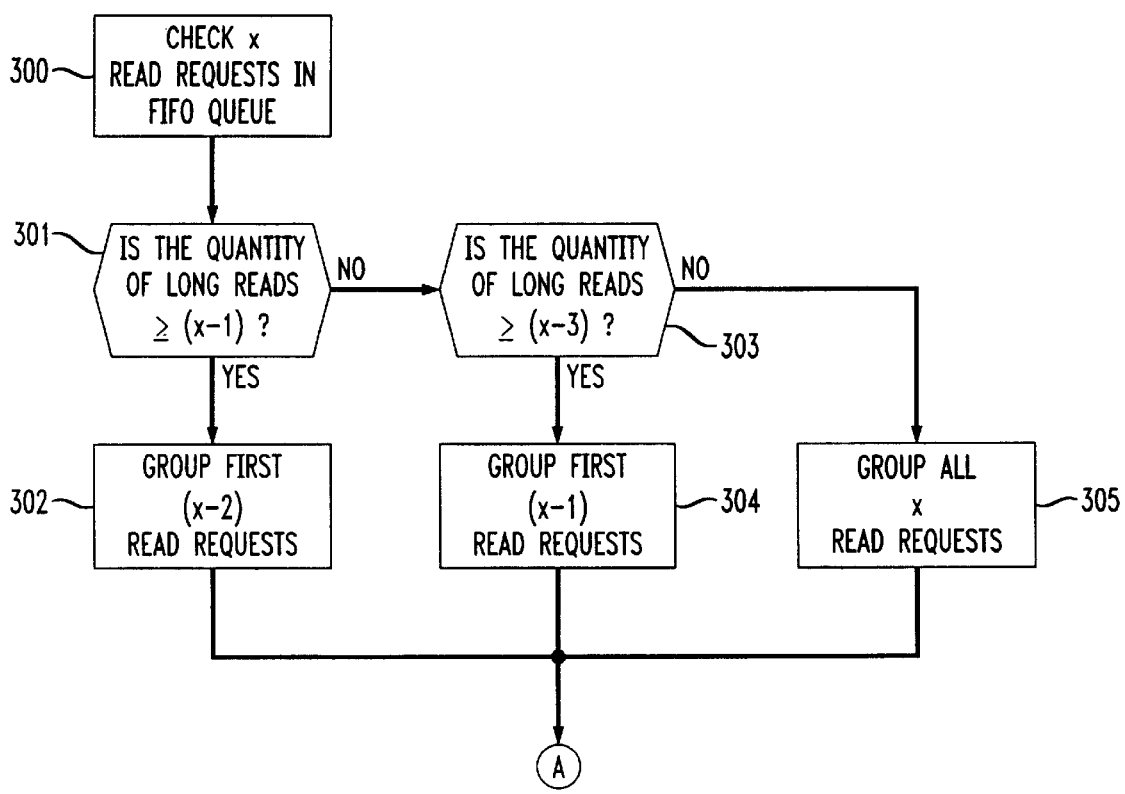
FIG. 3 is a flow diagram of an alternative approach to the processing used to group (i.e., select) read requests that are queued in a FIFO buffer.

FIG. 3 details an alternative approach to the group processing that yields a slightly improved performance. In this approach, x is equal to six. The first six read requests are checked 300 to determine how many reads are long. If there are five or more long read requests 301, then the first four form the group 302. Otherwise a check is performed to determine if the quantity of long read requests is three or more 303. If the quantity of long read requests is equal to three or four 304, then the first five read requests are selected. Otherwise all six read requests are selected 305.

Figure 4:
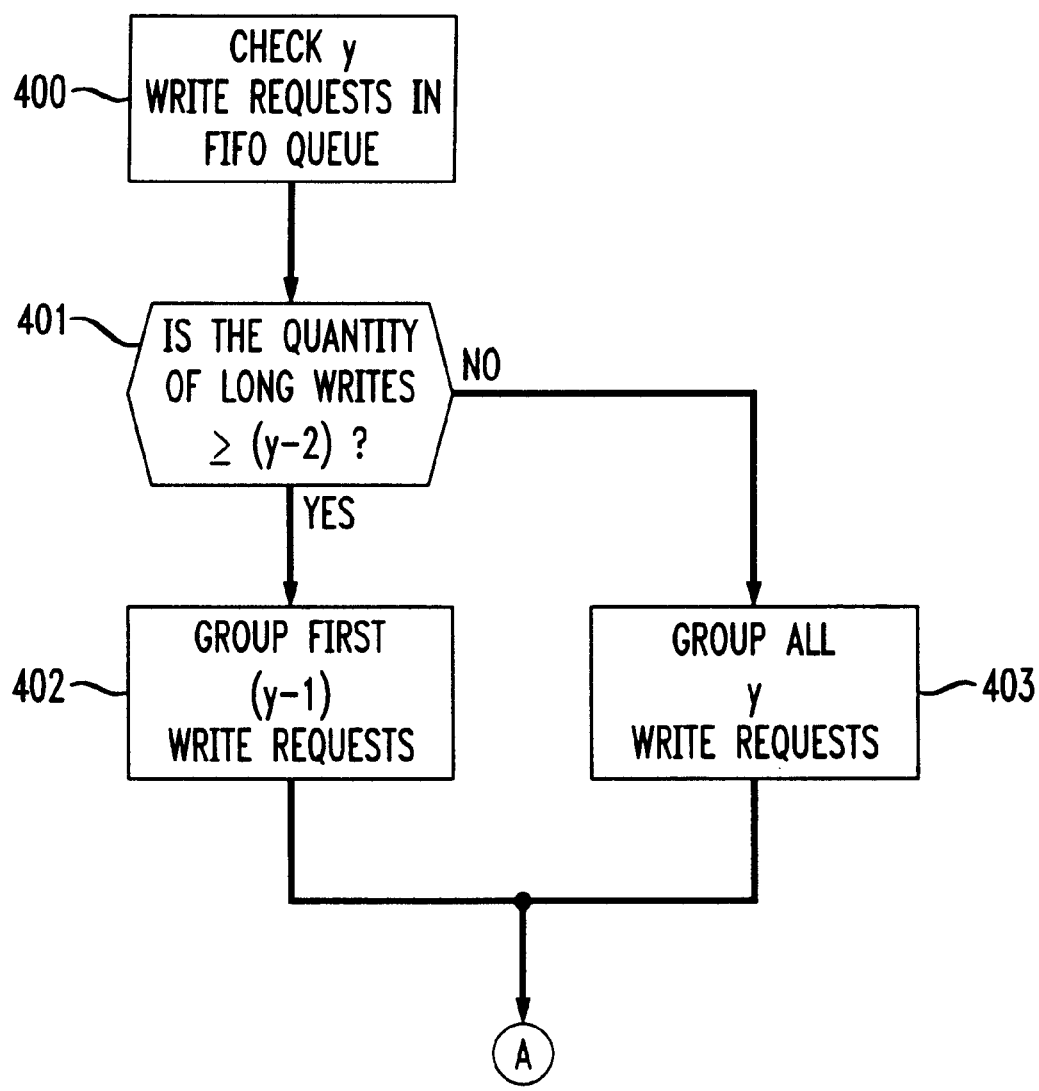
FIG. 4 is a flow diagram of the processing used to group (i.e., select) write requests that are queued in a FIFO buffer.

FIG. 4 details the group processing for write requests where y is equal to five in the current embodiment. The first five write requests are checked 400 to determine how many writes are long. If there are three or more long write requests 401, then the first four are selected 402 otherwise all five write requests are selected 403. This same logic is sustained for the alternative case of examining six entries.

This embodiment leverages multiple banks of memory: a.) a set of even banks, Bank 0 and Bank 2; and b.) a set of odd banks, Bank 1 and 3. There is no bank selection for read requests. The data is stored in either the even or the odd banks and is retrieved from the location in which it is stored. If multiple free list are utilized 108, a free list would be associated with the odd banks and the other with the even banks. However, once the requests have been selected, the bank selection needs to be established. This will optimize throughput by avoiding a bank conflicts and accommodate the bus turn around time. The bank selection process controls the order in which read and write requests are executed to accommodate the appropriate bank availability. When accessing memory, a 128-byte request is treated as atomic. Atomic means that the write requests will be processed sequentially without interleaving any reads. This supports optimized throughput since the banks are guaranteed not to conflict.

Figure 5:
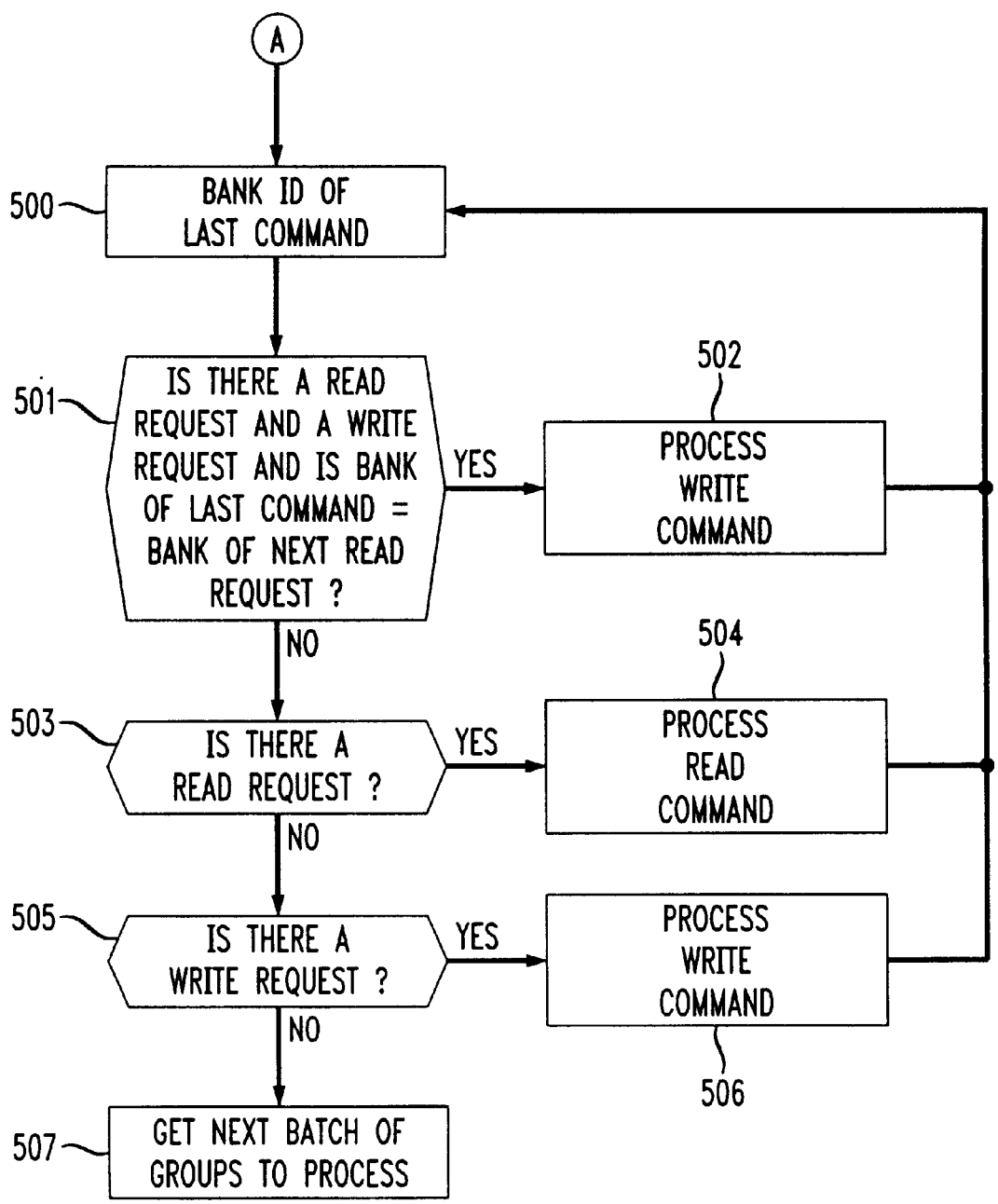
FIG. 5 is a flow diagram of the processing used to execute read and requests.

FIG. 5 provides the flow diagram used to select the appropriate bank for the selected read and write requests. The last bank identifier 500 is determined. Then, a check is performed to determine if a read request and a write request are present along with a check to determine if the bank of the next read request is the same bank of the last command 501. If these conditions exist, then one of the selected write requests will be executed 502. Otherwise, a check will be made to determine if a read request is present 503. If a read request is present then, one of the selected read requests will be executed 504. Otherwise, a check will be made to determine if a write request is present 505. If a write request is present then, one of the selected read requests will be executed 506. This process continues until all the selected requests are process. Upon the completion of all requests being processed, the next batch of selected request will be processed 507.

Figure 6:
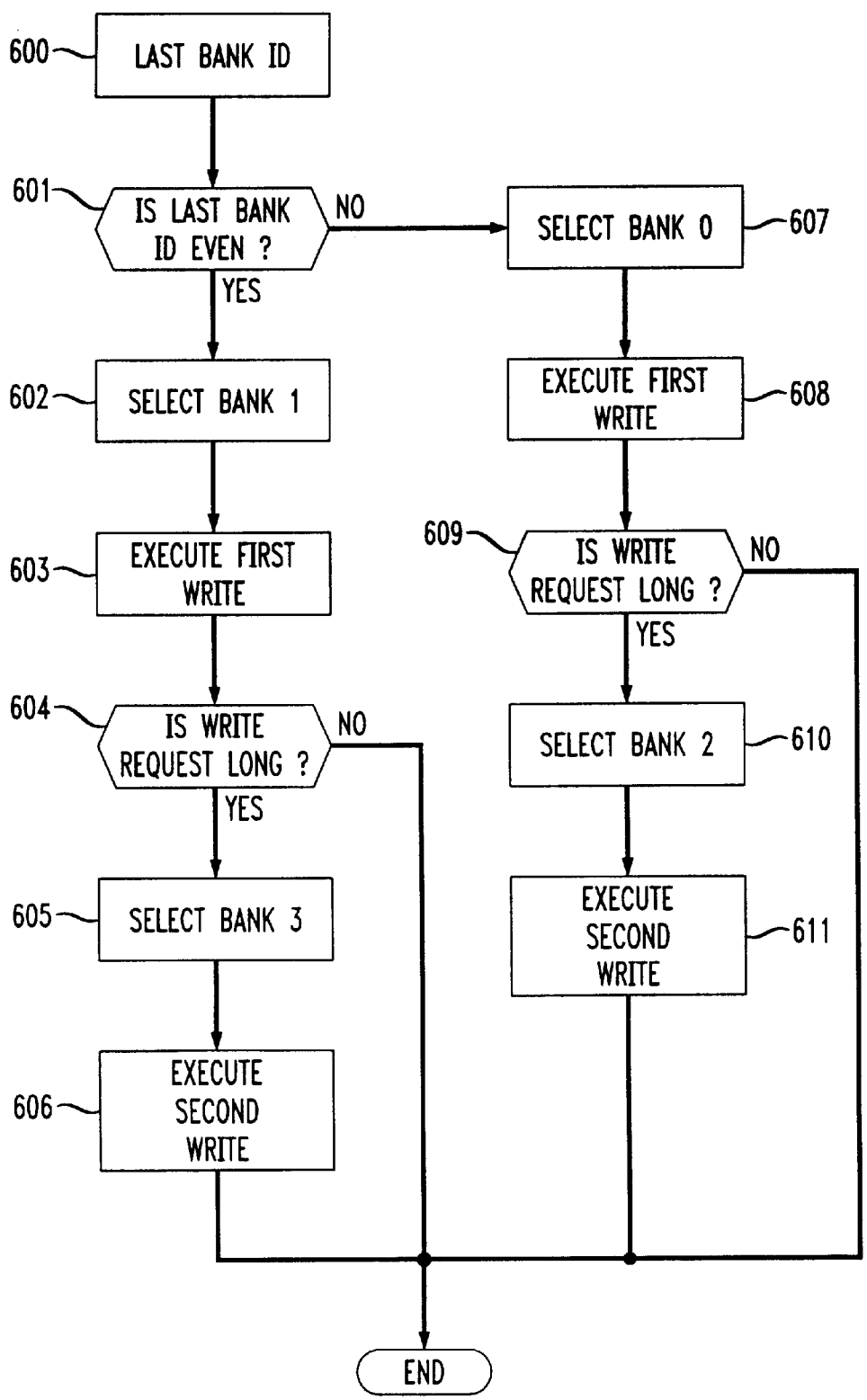
FIG. 6 is a flow diagram of the bank selection to process a write command.

Further bank processing is required for bank selection upon executing a write request as depicted in FIG. 6. The bank 600 that was utilized for the last execution is determined. If the last bank used is from the even set 601, select bank 1 602 and execute the first write word 603. If the write request is a long word 604 then, select bank 3 605 to complete the write request 606. Complimentary logic applies when the last bank used is an odd 601, the even set is utilized by the selection of bank 0 607. The first write word is executed 508. If the write request is a long word 609 then, select bank 2 610 to complete the write request 611.

This method also optimizes processing by utilizing a pipelined link list update scheme. Unique linked list management that allows pipelining is achieved by applying the following steps:

Step 1: Establish the address for data storage (i.e., the first pointer),

Step 2: Write data into a memory location, and

Step 3: Add the location of the memory written to the link list, Where Step 1 may be performed multiple times before Step 2 is performed provided the subsequent address ordering is maintained (typically a FIFO). Additionally, multiple independent link lists may be supported with the inclusion of a link list identifier.

Figure 7:
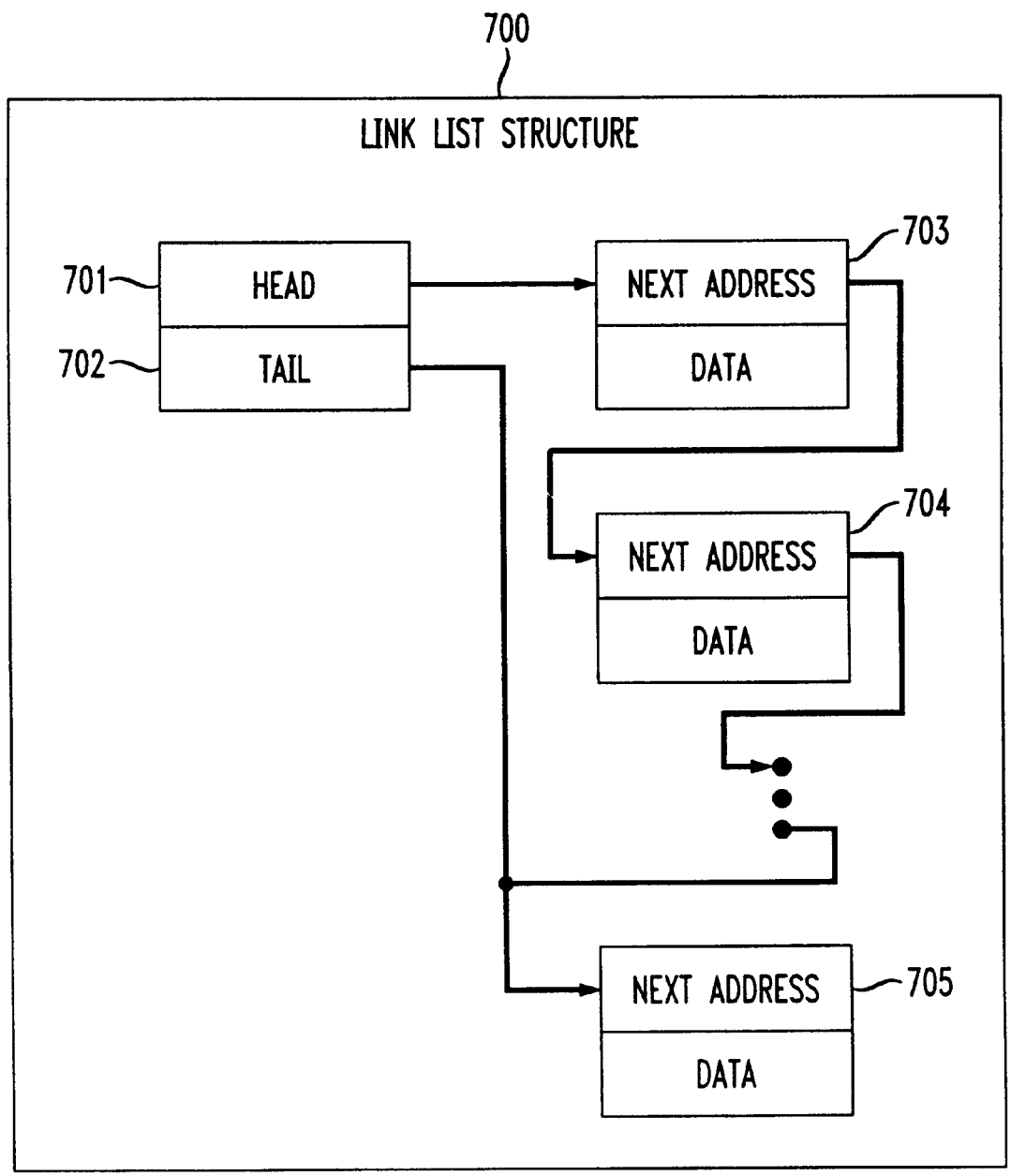
FIG. 7 is a diagram of the link list structure.

The structure depicted FIG. 7 is for the link lists. This link list structure 700 consists of a head pointer 701 and a tail pointer 702. The head pointer 701 provides the next address 703 in the link list. The tail pointer 702 is associated with the last address in the link list 705. Additional address pointers such as next address 704 are logically chained together in the link list structure.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

What is claimed is:

1. A method for writing chains of data groups in a memory system and reading chains of then linked data groups from the memory system comprising:

providing two or more addressable memory space allocations, each capable of holding multiple separately addressable data groups at least n bytes in size, with each allocation in a different memory region such that the writing of a second data group to any one allocation immediately after the writing of a first data group to a different allocation is not subject to the full access time delay which would occur if the second data group were written to the same space allocation as the first data group without any intervening write or read operations occurring between the writing of the first and second data groups to the space allocation;

writing data groups to a first of the memory space allocations for temporary storage therein;

writing data groups to the second or other memory space allocations, or reading data groups from any one of the memory space allocations, such that whenever two data groups are sequentially written without an intervening operation of reading a data group, the two data groups are written to different memory space allocations.

2. The method of claim 1 wherein the steps of writing data groups comprises the steps of:
    establishing a maximum number of allowable consecutive write requests for a group;
    classifying each write request by long and short requests;
    determining if the number of long requests is greater than the maximum number of allowable write requests minus two and if so, then limiting the number of write requests in a group to one less than the maximum number.

3. The method of claim 2 wherein the number of long write requests is equal to or less than the maximum number minus two and setting the number of write requests in a group to the maximum number.

4. The method of claim 1 wherein the step of reading data groups comprises the steps of:
    establishing a maximum number of allowable consecutive read requests for a group;
    classifying each read request by long and short requests;
    determining if the number of long requests is greater than or equal to the maximum number of allowable read requests and if so, then limiting the number of read requests in a group to two less than the maximum number.

5. The method of claim 4 wherein the number of long read requests is less than the maximum number minus one and setting the number of read requests in a group to the maximum number.

6. The method of claim 1 wherein the step of reading data groups comprises the steps of:
    establishing a maximum number of allowable consecutive read requests for a group;
    classifying each read request by long and short requests;
    determining if the number of long requests is greater than or equal to the maximum number of allowable read requests and if so, then limiting the number of read requests in a group to two less than the maximum number; and
    when the number of long read requests is less than the maximum number minus one and the number of long read requests is greater than or equal to the maximum number of read requests minus three, then setting the number of read requests in a group to the maximum number minus one.

7. The method of claim 6 wherein when the number of long read requests is less than the maximum number minus three, setting the number of read requests in a group to the maximum number.

8. The method of claim 1 and including, when the grouped read requests and grouped write requests are executed, the steps of:
    establishing a memory bank identification used for the last command executed;
    determining whether there is a pending write and read request and whether the memory which was last processed is a same bank for a next read request, and, if so, then,
    processing a next write request.

9. The method of claim 8 wherein either a write request is not present or the memory bank of the last command executed is not equal to the next read request memory bank location, and processing a read request.

10. The method of claim 9 wherein either a read request is not present or the memory bank of the last command executed is not equal to the next read request memory bank location, a write request is present and processing a write request.

11. The method of claim 1 wherein the memory is organized into multiple banks and processing of write requests comprises the steps of:
    identifying the memory bank used for the last read or write request; and
    processing the write request to a different one of the banks.

12. The method of claim 11 wherein the number of banks is three and the process of executing a write request includes determining whether the write request is long and, if so, executing a next write in another of the banks.

13. A communications system component comprising:
    circuitry configured to receive data groups from and transmit data groups to one or more other components;
    first registers for holding received data groups prior to storage thereof;
    second registers for holding data groups read from the memory storage space prior to transmission to another component; and
    a memory system for storing received data groups with defined link lists, including:
        memory storage space comprising two or more addressable memory space allocations, each allocation capable of holding multiple separately addressable data groups, address circuitry to the allocations configured such that:
            the writing of a second data group to any one allocation immediately after the writing of a first data group to the same allocation would be subject to a pre-determinable access time delay; and
            the writing of a second data group to any one allocation immediately after the writing of a first data group to a different allocation, without any intervening write or read operations occurring between the writing of the first and second data groups to the memory storage space, is not subject to the full amount of said predetermined access time delay; and
    circuitry controlling read and write operations between the first registers, the memory storage space and the second registers, configured to require that whenever two sequential write operations on different data groups occur with no intervening read operations, each of the two data groups is addressed to a different memory space allocation.

14. The communications system of claim 13 and including a first FIFO register for receiving write requests and a second FIFO register for receiving read requests.

15. The communication system of claim 14 and including an arbitrator for selecting a number of consecutive read and write requests to be processed based upon a length of the read and write requests in a group of requests being processed.

* * * * *